No. 771,138. PATENTED SEPT. 27, 1904.
S. FROST.
DISH.
APPLICATION FILED FEB. 8, 1904.
NO MODEL. 2 SHEETS—SHEET 1.

Witnesses
Inventor
Samuel Frost.
By Hubert S. Lawson
Attorney

No. 771,138. PATENTED SEPT. 27, 1904.
S. FROST.
DISH.
APPLICATION FILED FEB. 8, 1904.
NO MODEL. 2 SHEETS—SHEET 2.

Witnesses
Inventor
Samuel Frost.
By Hubert L. Lawson
Attorney

No. 771,138. Patented September 27, 1904.

UNITED STATES PATENT OFFICE.

SAMUEL FROST, OF EAST LIVERPOOL, OHIO.

DISH.

SPECIFICATION forming part of Letters Patent No. 771,138, dated September 27, 1904.

Application filed February 8, 1904. Serial No. 192,705. (No model.)

*To all whom it may concern:*

Be it known that I, SAMUEL FROST, a citizen of the United States, residing at East Liverpool, in the county of Columbiana and State of Ohio, have invented certain new and useful Improvements in Dishes, of which the following is a specification.

My invention relates to new and useful improvements in tureens and like dishes for table service; and its object is to provide a device of this character having a cover so constructed as to interlock with the body of the dish, and thereby be held against accidental displacement. Heretofore dishes of this character have been of two kinds—to wit, those having the covers fitting upon ledges within the body of the dish and those resting upon the edge of the dish and extending thereover. The great objection to both of these forms is the fact that the covers are readily displaced accidentally and fall within the bowl and either break or become soiled by the contents thereof.

My invention consists of a dish-body having extensions upon the edge thereof at desired intervals, and in rear of these extensions are formed ledges adapted to support portions of the cover. The other portions of the cover overlap the edges of the body and the adjoining points between the extensions thereon. It will thus be seen that the two parts of the dish interlock and cannot become accidentally displaced and the cover cannot slip into the dish.

The invention also consists in the further novel construction and combination of parts hereinafter more fully described and claimed, and illustrated in the accompanying drawings, showing the preferred form of my invention, and in which—

Figure 1:
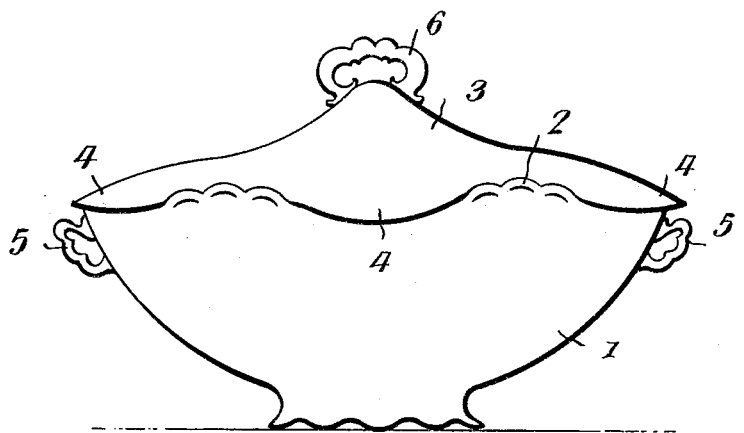
Figure 2:
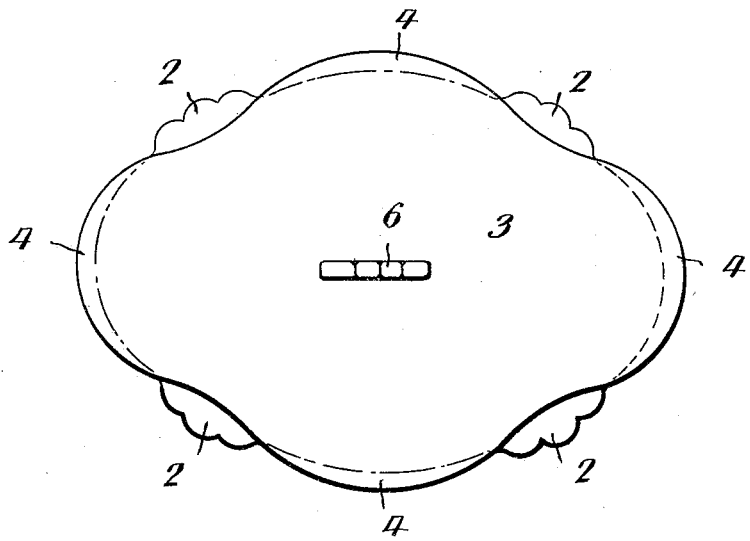
Figure 3:
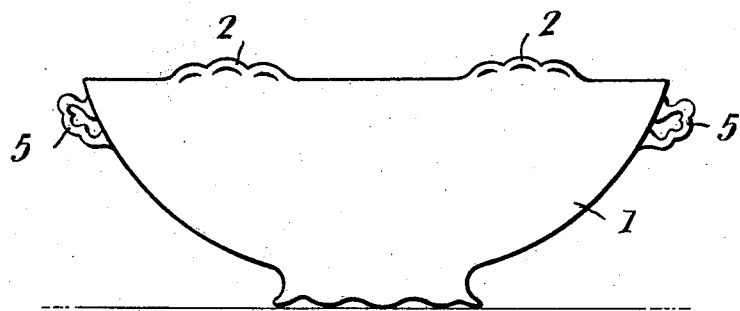

Figure 1 is a side elevation of a dish constructed in accordance with my invention. Fig. 2 is a top plan view thereof. Fig. 3 is a side elevation of the dish with the cover removed, and Fig. 4 is a perspective view of a modified form of dish.

Referring to the figures by numerals of reference, 1 is a dish of any suitable contour and having suitably-ornamented extensions 2 projecting upward from the edges thereof, these extensions being spaced apart desired distances. The extensions form ledges in rear thereof for supporting a cover 3, provided with downwardly-projecting extensions 4, which are adapted to overlap the edges of the dish 1 at points between the extensions 2. The extensions 4 are adapted to be suitably ornamented, as well as the extensions 2, and when the cover is once placed in position upon the dish 1 it will be understood that the same cannot be slid in any direction independently of the dish 1, nor can it be accidentally tilted so as to drop within the dish. Suitable handles 5 may be arranged upon the dish 1 and a handle 6 formed upon the cover 3.

Figure 4:
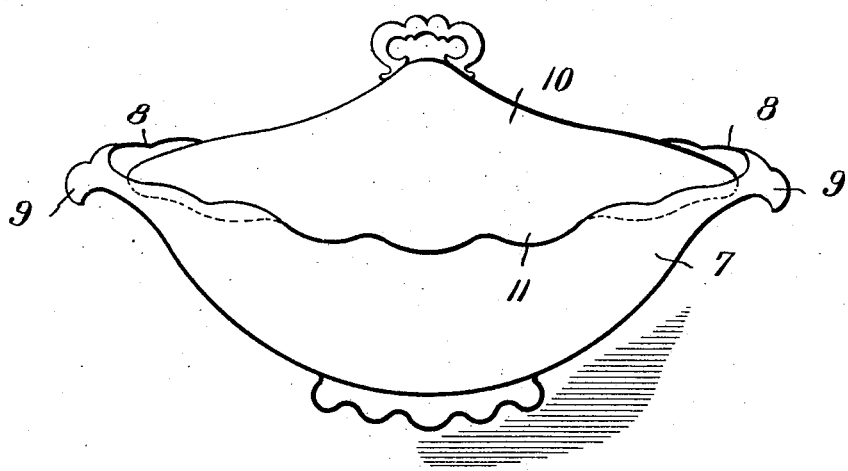

In Fig. 4 I have shown a modified form of dish the body 7 of which is provided with upwardly-extending portions 8 at opposite sides thereof, which terminate in handles or ears 9 and form edges upon the inner faces thereof. These projecting portions may be suitably ornamented and are utilized to enhance the appearance of the dish. A cover 10 is adapted to be placed upon the body 7 and between the projecting portions 8 thereof and has a downwardly-projecting portion 11 at each side thereof, which is adapted to fit between the projecting portions 8 and engage the straight edges of the dish which extend between the projecting portions 8.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with a dish having extensions projecting from the edges thereof and in alinement with the sides of the dish; of a cover adapted to rest upon the dish and between the extensions, and extensions to the cover adapted to overlap the edges of the dish and between its extensions.

2. The combination with a dish having extensions upon the edges thereof and alining with the walls of the dish, said extensions forming ledges upon their inner faces; of a cover adapted to be seated upon the ledges and between the extensions, and extensions upon the cover and overlapping opposite edges of the dish at points between the extensions of the dish.

3. The combination with a dish and a cover; of extensions upon the dish and cover adapted to interlock and form seats for those portions of the dish and cover between their respective extensions.

4. The combination with a dish having extensions upon the edges thereof and forming ledges upon their rear faces; of a cover supported by the ledges therebetween, extensions integral with and depending from the cover and adapted to project between the extensions on the dish and bear upon the portions of the dish between the extensions.

In testimony whereof I have signed my name to this specification in presence of two witnesses.

SAMUEL FROST.

Witnesses:
 JAS. F. McGARRY,
 HERBERT D. LAWSON.